3,459,719
PREPARATION OF LOW MOLECULAR WEIGHT VINYL CHLORIDE POLYMERS
Dean E. Richardson, La Marque, and Gordon G. Harkreader, Dickinson, Tex., assignors to Union Carbide Corporation, a corporation of New York
No Drawing. Filed Dec. 22, 1965, Ser. No. 515,714
Int. Cl. C08f *3/30, 15/30, 1/11*
U.S. Cl. 260—87.1                                     9 Claims

ABSTRACT OF THE DISCLOSURE

Polyvinyl chloride and polyvinyl chloride containing up to 25% vinyl acetate in the form of glassy, spherical, non-porous particles are prepared in an aqueous suspension in the presence of 2,2'-azobisisobutyronitrile initiator and polyvinyl pyrrolidone suspension agent at a temperature from about 75–95° C.

---

This invention relates to the preparation of low molecular weight vinyl chloride polymers and more particularly to glassy, spherical, dense, and non-porous vinyl chloride polymers produced by suspension or pearl polymerization having superior processing characteristics and excellent powder flow properties.

Myriad suspending systems have been disclosed in the technical and patent literature for the suspension polymerization of vinyl chloride with and without comonomers. A partial list would include natural polymeric agents such as starch, pectin, plant gums, gelatin and the like; modified natural polymeric agents such as methyl cellulose, carboxymethyl cellulose sodium salt, hydroxyethyl cellulose and the like; synthetic polymeric agents such as polyacrylic acid salts, polyvinyl alcohol, sulfonated styrene, polyethylene glycol esters and the like; inorganic agents such as kaolin, talcum, tricalcium phosphate, bentonite and the like.

However, very few of these suspending agents are stable or maintain their function as a protective colloid in aqueous suspension polymerization systems above about 75° C. Thus in suspension processes aimed at the preparation of low molecular weight vinyl polymers by utilizing high temperature, i.e., in the range of about 75 to 95° C., the choice of suitable suspending agent is severely restricted.

As an additional restriction, most of the commercially used suspending agents must also be used in the presence of other materials such as buffers, surfactants, chain transfer agents, secondary or auxiliary suspending agents and the like.

Furthermore, many of the known suspending agents afford only vinyl chloride polymers in the form of irregular, opaque, non-glassy, low density, and porous particles, which are unsuitable for end use applications where plasticizer absorption is undesirable and ease of extrusion is required.

It is an object of the present invention to provide a suspension polymerization process for the production of low molecular weight vinyl chloride polymers in the form of glassy, spherical, non-porous particles having a high bulk density, a narrow particle size distribution, and superior processing and powder flow characteristics.

It is another object to provide a suspension polymerization process for the production of low molecular weight vinyl chloride/vinyl acetate copolymers with a high conversion of the vinyl acetate monomer charged.

It is still another object to provide a suspension polymerization process for the production of low molecular weight vinyl chloride polymers with a single suspending agent in the absence of surfactants, buffers, chain transfer agents and polymerization inhibitors.

It has now been found that these and other related objects can be accomplished by a suspension polymerization process which comprises heating an agitated aqueous suspension of vinyl monomer consisting essentially of vinyl chloride and from 0 to 25% by weight of vinyl acetate in the presence of from about 0.04% to 0.4% by weight, based on the weight of vinyl monomer of polyvinyl pyrrolidone and from about 0.02% to 0.15% by weight base on the weight of vinyl monomer, of 2,2'-azobisisobutyronitrile at a temperature of about 75° C. to 95° C. for at least 3.0 hours.

The maximum polymerization time is not narrowly critical since the polymerized product is unaffected by further exposure to the polymerization conditions.

The polymerization vessels suitable for the practice of this invention on a large commercial scale, are closed reactors or autoclaves capable of withstanding the autogenous pressure developed by the vinyl chloride monomer vapor. For laboratory scale polymerization, sealed glass bottles or ampoules can also be used.

The instant process can be carried out as a batch or continuous process although a batch process is particularly preferred. The batch copolymerization of vinyl chloride and vinyl acetate can be effected with the entire quantity of vinyl monomer charged to the reactor initially or by a continuous portionwise addition of them.

Polymerization pressure is not itself critical but depends on the autogenous pressure generated by the vinyl chloride monomer present in the reactor and can be used to indicate its degree of conversion to polymer.

The term "low molecular weight vinyl chloride polymers" is defined as those polymers having an inherent viscosity of less than about 0.6 when measured at a concentration of 0.2% of polymer for 100 ml. of cyclohexanone at 30° C. in conformity with ASTM 1243 method A. Other test methods used to characterize the vinyl chloride polymers obtained in the process include the following.

Apparent density in lbs./cu. ft. was determined in accordance with ASTM D–1182.

Particle size distribution was determined by screen analysis with a set of standard sieves. The percent polymer passing through 60, 80, 100, 140, 200, and 270 mesh screens was recorded.

Median particle size was determined by use of the screen analysis data to graphically determine the sieve opening at which 50% of the resin would be retained.

The determination of shape, porosity, transparency and other bead properties was made visually through a 50 power microscope.

The assay of vinyl chloride in the vinyl chloride copolymers was made indirectly by measuring the absorbance of a 2 g. sample dissolved in 100 ml. of ethylene dichloride at 5.76 microns in a Perkin-Elmer Model 21 infrared spectrometer. By comparing the absorbance value with a calibration curve prepared with vinyl chloride/vinyl acetate copolymers containing known amounts of vinyl acetate, the vinyl acetate content of the copolymer can be determined. The vinyl chloride content is then calculated by difference.

The glassy, spherical, dense, and non-porous vinyl chloride polymer particles of the present invention are well suited for any application not involving plasticizer absorption such as for rigid calendering and extrusion, vinyl blowmolding, and the like. These copolymers are suitable for vinyl asbestos flooring, sound records, blowmolded containers, vinyl pipe and the like.

H. Fikentscher, K. Herrle and J. Jousset in German Patent 801,233 reveal the use of polyvinyl pyrrolidone in the suspension polymerizations of butyl acrylate, methyl methacrylate, vinyl acetate, and styrene with benzoyl peroxide as the free radical initiator. Unlike vinyl chloride, all of the above-described vinyl monomers form polymers which are soluble in the unreacted monomer. These same inventors disclose in German Patent 801,746 that vinyl compounds such as acrylonitrile, vinyl chloride or dichloroethylene could not be successfully homopolymerized to yield granular polymers of uniform size and rounded shape. These polymers were invariably obtained as a coagulant powder having irregular, angular edges. These inventors found that with such monomers, whose polymers are insoluble in their own monomers, granular polymers of uniform size and rounded shape (pearls or spheres) could be obtained if copolymerization is carried out with other monomers which afford copolymers that are soluble in the monomer mixture. They further disclosed that preferably 100% or more of these "solubilizing" monomers is required, with the lower limit being at least 10%. The working examples given in German Patent 801,746 use benzoyl peroxide exclusively as the free-radical initiator with such "solubilizing" comonomers as styrene, methyl methacrylate, and butyl methacrylate copolymerized with acrylonitrile or dichloroethylene.

K. Herrle in German Patent 810,812 asserts that unless water-soluble polymerization inhibitors, such as multivalent phenols, methylene blue or water-soluble copper compounds, are used in the suspension polymerization of vinyl monomers, carried out in the presence of water-soluble colloids, such as polyvinyl pyrrolidone, a substantial amount of the polymerization product is obtained not in the form of pearls, but as flakes or as dispersed, minute particles, both of which are undesirable. Thus in his working examples, disclosing the suspension polymerization of vinyl acetate and of vinyl chloride and vinyl acetate in the presence of polyvinyl pyrrolidone and benzoyl peroxide, copper sulfate or methylene blue is used by Herrle as a polymerization inhibitor.

In U.S. Patent 2,857,367, J. J. Kearney discloses the suspension polymerization of vinyl chloride utilizing as the suspending agent dextran either alone or as a primary dispersant in combination with a lengthy list of secondary dispersants, one of which is polyvinyl pyrrolidone. It is noteworthy that the polymers thus obtained are characterized by this invention as having a "highly porous structure."

In U.S. Patent 2,890,199, D. G. McNulty and R. I. Leininger disclose the suspension polymerization of vinyl chloride using in the suspending system a combination of polyvinyl pyrrolidone and a secondary dispersant. Again it should be noted that the polymers obtained thereby are characterized by the inventors as having a "highly porous structure." Furthermore they accent the fact that the invention is not restricted to any particular catalyst and that peroxide catalysts are preferred with lauroyl peroxide being an especially effective catalyst.

It is therefore unexpected in view of the prior art teachings that low molecular weight vinyl chloride polymers can be prepared in the form of glassy, spherical, nonporous particles having a high bulk density, a narrow particle size distribution and superior processing and powder flow characteristics by a process which employs only the vinyl monomer, water, polyvinyl pyrrolidone and 2,2'-azobisisobutyronitrile.

The simplicity of the process is not only surprising but fortuitous inasmuch as it obviates the storage, handling, control and possible interaction of the inhibitors, buffers, surfactants and secondary suspending agents apparently held to be de rigueur by those practicing the prior art.

It is not known why 2,2'-azobisisobutyronitrile, when used solely with polyvinyl pyrrolidone, achieves the objects outlined above but it is a unique fact apparently due to the synergistic combination of this specific free-radical initiator and this specific suspending agent.

While chain transfer agents may be used to slightly lower the molecular weight of the vinyl chloride polymers obtained in the claimed process, they introduce such undesirable concomitant effects as decreased reaction rate, formation of color bodies, and lower heat stability and, in general, increase the cost of the polymer produced.

The use of secondary suspending agents or surfactants does not improve the claimed process, but rather results in decreased bulk density and increased porosity of the vinyl chloride polymers obtained.

Peroxide initiators do not afford the synergistic effects of 2,2'-azobisisobutyronitrile and in the case of aromatic peroxides, such as benzoyl peroxide, decrease the thermal stability of the vinyl chloride polymers produced by them. They also do not achieve the high conversion of vinyl acetate in copolymerization with vinyl chloride comparable to the results obtained with 2,2'-azobisisobutyronitrile.

The instant invention is a distinct improvement over the prior art not only in its simplicity and hence decreased operating costs, but in the particular case of vinyl chloride/vinyl acetate copolymers in the high degree of vinyl acetate conversion achieved vis a vis other suspension polymerization systems. This is extremely important from an economic standpoint. Since vinyl chloride has a higher reactivity ratio than vinyl acetate, it reacts faster and in a batch copolymerization of these two monomers, the monomer mixture becomes progressively richer in vinyl acetate as the polymerization reaction proceeds. Accordingly, when the polymerization is terminated, there is a substantial amount of unreacted vinyl acetate monomer left. Part of the unreacted vinyl acetate is physically admixed with the copolymer particles, while the remainder is dissolved in the aqueous phase. The vinyl acetate dissolved in the aqueous phase is lost when the resin product slurry is stripped free of water. The vinyl acetate monomer confined in the polymer particles diffuses very slowly to the particle surface and thus interferes with and prolongs the drying of the resin. The cost saving involved by the achievement of higher vinyl acetate conversions therefore is obvious.

The polyvinyl pyrrolidones used in this invention have a weight average molecular weight of about 10,000 to 360,000 or more. These polymers of vinyl pyrrolidone are available commercially. The high molecular weight grades of polyvinyl pyrrolidone are generally preferred because of their economy in use, that is to say, less of these grades is required to effect suspension of the vinyl monomer than the lower molecular weight grades. The preferred concentration of polyvinyl pyrrolidone having a molecular weight of about 360,000 is about 0.06% to 0.2% based on the weight of vinyl monomer although concentrations ranging from about 0.04% up to 0.4% and even higher can also be used if desired.

The concentration of 2,2'-azobisisobutyronitrile used in the practice of this invention is preferably from about 0.02% to about 0.1% by weight based on the weight of vinyl monomer charge, although concentrations from about 0.02% to about 0.15% and higher can be used if desired.

The invention is further illustrated in the examples which follow in which all parts and percentages are by weight unless otherwise specified.

Example 1

2,100 parts of deionized water containing 0.9 part of polyvinyl pyrrolidone (mol. wt. 360,000) was charged to a 600-gallon, jacketed, stainless steel autoclave, fitted with a low-shear, retreat-curve impeller. Agitating at 215 r.p.m., 900 parts of vinyl chloride and 0.45 part of 2,2'-azobisisobutyronitrile were added. The agitation was continued while the contents of the autoclave were heated to and held at 83° C. for 3 hours. The reaction was terminated by cooling and venting when the pressure dropped to 90 p.s.i.g. The resin was found in the form of dense, spherical, glassy particles having a median particle size of 115 microns. Bulk density of the resin was 33 lb. per cu. ft., and inherent viscosity (ASTM 1243 Method A) was 0.512. No particle agglomeration was noted, indicating excellent suspension stability.

Example 2

In the same vessel and manner described in Example 1 2,100 parts of deionized water containing 1.08 parts of polyvinyl pyrrolidone (mol. wt. 360,000) was charged to the autoclave. 765 parts of vinyl chloride, 135 parts of vinyl acetate and 0.54 part of 2,2'-azobisisobutyronitrile were added with agitation. The contents of the autoclave were heated to 76° C. and maintained at this temperature for 7.0 hours, after which the run was terminated. The resin was recovered by water washing, dewatering and drying. The resin was recovered as dense, glassy, spherical particles having a median particle size of 130 microns and a bulk density of 40.4 lb. per cu. ft. PVC (polyvinyl chloride) content of the resin was 86.7% inherent viscosity (ASTM 1243 Method A) was 0.523. No agglomeration was noted.

Eample 3

In the same manner and using the same vessel as in Example 1, the autoclave was first charged with 2,100 parts of deionized water containing 1.35 parts of polyvinyl pyrrolidone (mol. wt. 360,000). Then 765 parts vinyl chloride, 135 parts of vinyl acetate and 0.45 part of 2,2'-azobisisobutyronitrile were charged with agitation. The contents of the autoclave were heated to 85° C. and maintained at this temperature with stirring, for 5 hours, at which time the run was terminated. After recovery by water washing, centrifuging and drying, the resin was found to consist of glassy, spherical particles having a median particle size of 250 microns and a bulk density of 43.6 lb. per cu. ft. PVC content was 86.8% and inherent viscosity (ASTM 1243 Method A) was 0.470. No substantial agglomeration was noted.

Example 4

Using a jacketed, glass-lined pressure vessel of 4,700 gals. capacity, fitted with a low-shear, retreat curve agitator, 20,000 parts of deionized water containing 11.1 parts of polyvinyl pyrrolidone (mol. wt. 360,000) were charged initially. Then, with agitation, 7,020 parts of vinyl chloride, 1,550 parts of vinyl acetate, 137 parts of trichloroethylene and 3.3 parts of 2,2'-azobisisobutyronitrile were charged to the vessel. The autoclave was heated to 80° C. and maintained at that temperature for 5.5 hours, after which the run was terminated. The resulting clear, glassy particles had a median particle size of 190 microns and a bulk density of 37.2 lb./cu. ft. PVC content was 86.3% and inherent viscosity was 0.423 (ASTM 1243 Method A). Analysis of the resin, using a bromination technique, showed 0.90% unreacted vinyl acetate.

Control A

For comparison, a resin prepared under the same conditions except using 12.5 parts dilauroyl peroxide as catalyst had a PVC content of 87.8%, an inherent viscosity of 0.401 and an unreacted vinyl acetate content of 1.7%. These results show the substantial improvement in vinyl acetate conversion which results from use of this invention.

Control B

Using the same vessel and the same procedure as described in Example 2, a vinyl chloride/vinyl acetate copolymer was made, using the same quantities of ingredients except that 0.72 part of dilauroyl peroxide free-radical initiator and 1.08 parts of "Elvanol 50-42" (Trademark for an 88% hydrolyzed polyvinyl alcohol) suspending agent were used. A reaction temperature of 75° C. was maintained. After 4.2 hours, the resin agglomerated into large strings and chunks and the run had to be terminated and recorded as an unsuccessful one.

Control C

Using the same vessel and the same procedure as described in Example 2, a vinyl chloride/vinyl acetate copolymer was made, using the same quantities of ingredients except that 0.72 part of dilauroyl peroxide catalyst and 1.35 parts of "Cellosize WP-300" (a Union Carbide Corporation trademark for hydroxyethyl cellulose) suspending agent were used. A polymerization temperature of 75° C. was maintained. After one hour, the resin agglomerated into strings and large balls, and had to be discarded as a completely unsatisfactory product.

Although the invention has been described in its preferred forms with a certain degree of particularity, it is understood that the present disclosure has been made only by way of example, and that numerous changes can be made without departing from the spirit and scope of the invention.

What is claimed is:

1. Process for preparing low molecular weight vinyl chloride polymer in the form of glassy, spherical, non-porous particles having a high bulk density and a narrow particle size distribution which comprises heating an agitated, aqueous suspension of vinyl monomer conissting essentially of vinyl chloride and from 0 to about 25% by weight of vinyl acetate in the presence of from about 0.04 to 0.4% by weight, based on the weight of vinyl monomer, of polyvinyl pyrrolidone and from about 0.02 to 0.15% by weight, based on the weight of vinyl monomer, of 2,2'-azobisisobutyronitrile at a temperature of about 75 to 95° C. for at least 3.0 hours.

2. Process claimed in claim 1 wherein the polyvinyl pyrrolidone has a weight average molecular weight of at least 10,000.

3. Process claimed in claim 1 wherein the polyvinyl pyrrolidone has a weight average molecular weight of at least about 360,000.

4. Process claimed in claim 1 wherein the vinyl monomer is vinyl chloride.

5. Process claimed in claim 1 wherein the vinyl monomer consists of about 80-90% by weight of vinyl chloride and about 10-20% by weight of vinyl acetate.

6. Process claimed in claim 1 wherein the temperature is about 80° C. to 90° C.

7. Process claimed in claim 1 wherein the residual pressure remaining at the end of the polymerization is at least about 15 p.s.i.g. lower than the initial pressure.

8. Process claimed in claim 1 wherein the reaction time is about 3 to 10 hours.

9. Process claimed in claim 1 wherein the vinyl chloride polymer is recovered by washing with water, centrifuging and drying.

References Cited

UNITED STATES PATENTS

| 2,862,912 | 12/1958 | Ott. | |
| 2,890,199 | 6/1959 | McNulty et al. | |
| 3,035,032 | 5/1962 | Collinson et al. | 260—87.1 |
| 2,886,552 | 5/1959 | Heiligmann et al. | |
| 3,053,801 | 9/1962 | Bingham et al. | |

FOREIGN PATENTS 932,134   7/1963   Great Britain.

JOSEPH L. SCHOFER, Primary Examiner

J. A. DONAHUE, JR., Assistant Examiner

U.S. Cl. X.R.

260—92